US011955713B2

(12) United States Patent
Jahromi et al.

(10) Patent No.: US 11,955,713 B2
(45) Date of Patent: Apr. 9, 2024

(54) ANTENNA WITH TILTED BEAM FOR USE ON ANGLED SURFACES

(71) Applicant: NovAtel Inc., Calgary (CA)

(72) Inventors: Alireza Gharaati Jahromi, Edmonton (CA); Mohammad Saeid Ghaffarian Moslemi, Edmonton (CA); Rashid Mirzavand Boroujeni, Edmonton (CA)

(73) Assignee: NovAtel Inc., Calgary (CA)

( * ) Notice: Subject to any disclaimer, the term of this patent is extended or adjusted under 35 U.S.C. 154(b) by 108 days.

(21) Appl. No.: 17/362,116

(22) Filed: Jun. 29, 2021

(65) Prior Publication Data

US 2021/0408694 A1 Dec. 30, 2021

Related U.S. Application Data

(60) Provisional application No. 63/046,382, filed on Jun. 30, 2020.

(51) Int. Cl.
*H01Q 9/27* (2006.01)
*H01Q 1/08* (2006.01)
(Continued)

(52) U.S. Cl.
CPC ............. *H01Q 15/04* (2013.01); *H01Q 1/085* (2013.01); *H01Q 1/1271* (2013.01);
(Continued)

(58) Field of Classification Search
CPC .... H01Q 1/085; H01Q 1/1271; H01Q 1/1285; H01Q 1/241; H01Q 1/32; H01Q 1/3283;
(Continued)

(56) References Cited

U.S. PATENT DOCUMENTS 3,599,214 A 8/1971 Altmayer
5,175,561 A * 12/1992 Goto ...................... H01Q 13/18 343/769
(Continued)

FOREIGN PATENT DOCUMENTS

DE 112014006587 T5 3/2017
WO WO-2005117204 A1 * 12/2005 ........... H01Q 1/3266
(Continued)

OTHER PUBLICATIONS

IEEE Standard for Definitions of Terms for Antennas, 2013, The Institute of Electrical and Electronics Engineers, Inc., retrieved from https://ieeexplore.ieee.org/document/6758443 (Year: 2013).*
(Continued)

*Primary Examiner* — Ab Salam Alkassim, Jr.
*Assistant Examiner* — Leah Rosenberg
(74) *Attorney, Agent, or Firm* — Cesari and McKenna, LLP

(57) ABSTRACT

An antenna that provides a radiation pattern that is tilted relative to the perpendicular to the plane of the antenna is provided. The antenna may be located on an angled surface, but have its tilted beam reach maximum gain at its zenith. In alternative embodiments, the antenna may be substantially transparent or translucent allowing placement on a surface without blocking viewing through the surface.

18 Claims, 9 Drawing Sheets

(51) Int. Cl.

| | |
|---|---|
| ***H01Q 1/12*** | (2006.01) |
| ***H01Q 1/24*** | (2006.01) |
| ***H01Q 1/32*** | (2006.01) |
| ***H01Q 1/36*** | (2006.01) |
| ***H01Q 9/04*** | (2006.01) |
| ***H01Q 13/10*** | (2006.01) |
| ***H01Q 13/16*** | (2006.01) |
| ***H01Q 15/04*** | (2006.01) |

(52) U.S. Cl.
CPC ............... *H01Q 1/241* (2013.01); *H01Q 1/32* (2013.01); *H01Q 1/36* (2013.01); *H01Q 9/0428* (2013.01); *H01Q 9/27* (2013.01); *H01Q 13/10* (2013.01); *H01Q 13/16* (2013.01)

(58) Field of Classification Search
CPC .. H01Q 1/36; H01Q 1/38; H01Q 1/40; H01Q 9/0428; H01Q 9/27; H01Q 13/10; H01Q 13/16
See application file for complete search history.

(56) References Cited

U.S. PATENT DOCUMENTS

| | | | | |
|---|---|---|---|---|
| 6,384,790 | B2 | 5/2002 | Dishart et al. | |
| 7,656,357 | B2 | 2/2010 | Ishibashi et al. | |
| 9,755,300 | B2 | 9/2017 | Kagaya et al. | |
| 9,806,398 | B2 | 10/2017 | Shimo et al. | |
| 9,837,707 | B2 | 12/2017 | Villarroel et al. | |
| 9,985,333 | B2 | 5/2018 | Takeuchi et al. | |
| 10,490,877 | B2 | 11/2019 | Talty et al. | |
| 10,524,356 | B2 | 12/2019 | Tombs | |
| 2006/0152422 | A1* | 7/2006 | Kubba ................. | H01Q 1/1271 343/700 MS |
| 2008/0030394 | A1* | 2/2008 | Yoshida ............... | H01Q 1/3233 342/73 |
| 2009/0140938 | A1* | 6/2009 | Ishibashi .................. | H01Q 1/44 343/897 |
| 2011/0109518 | A1 | 5/2011 | Kang et al. | |
| 2014/0266931 | A1 | 9/2014 | Shkembi | |
| 2015/0207203 | A1 | 7/2015 | Lee et al. | |
| 2016/0372815 | A1 | 12/2016 | Hayashi et al. | |
| 2017/0324141 | A1* | 11/2017 | Talty ...................... | H01Q 9/045 |
| 2019/0109381 | A1 | 4/2019 | Tombs | |
| 2019/0110360 | A1* | 4/2019 | Tombs ................. | H01Q 1/1271 |
| 2019/0261464 | A1 | 8/2019 | Noda et al. | |

FOREIGN PATENT DOCUMENTS

| | | | | |
|---|---|---|---|---|
| WO | WO-2015158361 | A1 | 10/2015 | |
| WO | WO-2019070420 | A1 | 4/2019 | |
| WO | WO-2020244743 | A1 * | 12/2020 | ............ H01Q 13/20 |

OTHER PUBLICATIONS

Abdelrahim, Waleed, et al., "Compact Broadband Dual-Band Circularly Polarised Antenna for Universal UHR RFID Handheld Reader and GPS Applications," The Institute of Engineering Technology, IET Journal, IET Microwaves, Antennas & Propagation, vol. 13, No. 10, Apr. 2019, pp. 1664-1670.

B, Sakthi Abirami, et al., "A Compact Conformal Windshield Antenna for Location Tracking on Vehicular Platforms," IEEE, IEEE Transactions on Vehicular Technology, vol. 68, No. 4, Apr. 2019, pp. 4047-4050.

Bandi, Sanjay, et al., "Transparent Circular Monopole Antenna for Automotive Communication," ACES, Applied Computational Electromagnetics Society Journal, ACES Journal, vol. 34, No. 5, May 2019, pp. 704-708.

Bilgic, M. M., et al., "Modified Annular Ring Antenna for GPS and SDARS Automotive Applications," IEEE, IEEE Antennas Wireless Propagation Letters, vol. 15, Dec. 29, 2015, 1442-1445.

Chen, Yue-Ying, et al., "Dual-Band Dual-Sense Circularly Polarized Slot Antenna With a C-Shaped Grounded Strip," IEEE, IEEE Antennas and Wireless Propagation Letters, vol. 10, Sep. 1, 2011, pp. 915-918.

Colombel, F. et al., "Ultrathin Metal Layer, ITO Film and ITO/Cu/ITO Multilayer Towards Transparent Antenna," The Institute of Engineering Technology, IET Science, Measurement & Technology, vol. 3, No. 3, May 2009, pp. 229-234.

Hautcoeur, Julien, et al., "Large and Optically Transparent Multilayer for Broadband H-Shaped Slot Antenna," IEEE, IEEE Antennas and Wireless Propagation Letters, vol. 12, Jul. 18, 2013, pp. 933-936.

Hong, T., et al., "Radiation and Scattering Analysis of a Novel Circularly Polarized Slot Antenna," Taylor & Francis Group, Taylor & Francis, Journal of Electromagnetic Waves and Applications, vol. 24, No. 13, Aug. 2010, 1709-1720.

Hu, Shaoqing, et al., "Novel Compact Monopole Antennas for Global Navigation Satellite Systems," IEEE, 2015 IEEE 4th Asia-Pacific Conference on Antennas and Propagation (APCAP), Kuta, Bali, Indonesia, Jun. 30-Jul. 3, 2015, pp. 201-202.

Kang, Seok Hyon, et al., "Transparent Patch Antenna Using Metal Mesh," IEEE, IEEE Transactions on Antennas and Propagation, vol. 66, No. 4, Apr. 2018, pp. 2095-2100.

Kashanianfard, M. et al., "Vehicular Optically Transparent UHF Antenna for Terrestrial Communication," IEEE, IEEE Transactions on Antennas and Propagation, vol. 65, No. 8, Aug. 2017, pp. 3942-3949.

Liu, Guang, et al., "A Millimeter-Wave Multibeam Transparent Transmitarray Antenna at Ka-Band," IEEE, IEEE Antennas Wireless Propagation Letters, Apr. 2019, vol. 18, No. 4, pp. 631-635.

Liu, Xinyu et al., "Broadband Transparent Circularly-Polarized Microstrip Antennas for CubeSats," IEEE, 2016 IEEE International Symposium on Antennas and Propagation (APSURSI), AP-S-2016, Fajardo, PR, USA, Jun. 26-Jul. 1, 2016, pp. 1545-1546.

Lombardi, Jack P., et al., "Copper Transparent Antennas on Flexible Glass by Subtractive and Semi-Additive Fabrication for Automotive Applications," IEEE, 2018 IEEE 68th Electronic Components and Technology Conference (ECTC), San Diego, CA, May 29-Jun. 1, 2018, pp. 2107-2115.

Rabie, Mostafa Mahmoud, et al., "Transparent Microstrip GPS Antenna for Cubesat Applications," 17th International Conference on Aerospace Sciences & Aviation Technology, ASAT-17, Paper: ASAT-17-143-US, Military Technical Collage, Kobry Elkobbah, Ciro, Egypt, Apr. 11-13, 2017, pp. 1-12.

Rahayu, Yusnita, et al., "A compact Design of Transparent Microstrip Antenna for Wireless Car-to-Car Communication System," International Journal of Electrical, Energy and Power System Engineering (IJEEPSE), e-ISSN: 2654-4644, vol. 2, No. 2, Jun. 2019, pp. 12-15.

Ravindranath, P. et al., "Circularly Polarized Tilted Beam Microstrip Antenna," IEEE, IEEE-20180, 2012 Third International Conference on Computing, Communication and Networking Technologies (ICCCNT'12), Coimbatore, India, Jul. 26-28, 2012, pp. 1-4.

Rezaeieh, Sasan Ahdi, et al., "Pattern-Reconfigurable Magnetoelectric Antenna Utilizing Asymmetrical Dipole Arms," IEEE, IEEE Antennas and Wireless Propagation Letters, vol. 18, No. 4, Apr. 2019, pp. 688-692.

Rui, Xu, et al., "Dual-Band Dual-Sense Circularly Polarised Square Slot Antenna With Simple Structure," The Institution of Engineering and Technology, Electronics Letters, vol. 52, No. 8, Apr. 14, 2016, pp. 578-580.

Ryan, Colan G. M., et al., "Single- and Dual-Band Transparent Circularly Polarized Patch Antennas With Metamaterial Loading," IEEE, IEEE Antennas and Wireless Propagation Letters, vol. 14, Nov. 6, 2014, pp. 470-473.

Sharma, Sameer K., et al., "A Micro Copper Mesh-Based Optically Transparent Triple- Band Frequency Selective Surface," IEEE, IEEE Antennas and Wireless Propagation Letters, vol. 18, No. 1, Jan. 2019, pp. 202-206.

Sun, C., et al., "Analysis and Design of a Low -Cost Dual-Band Compact Circularly Polarized Antenna for GPS Application," IEEE, IEEE Transactions on Antennas and Propagation, vol. 64, No. 1, Jan. 2016, 365-370.

(56) References Cited

OTHER PUBLICATIONS

Ullah, Ubaid, et al., "A Novel Coplanar-Strip-Based Excitation Technique for Design of Broadband Circularly Polarization Antennas With Wide 3 dB Axial Ratio Beamwidth," IEEE, IEEE Transactions on Antennas and Propagation, vol. 67, No. 6, Jun. 2019, pp. 4224-4229.

Xu, Rui, et al., "A Design of U-Shaped Slot Antenna With Broadband Dual Circularly Polarized Radiation," IEEE, IEEE Transactions on Antennas and Propagation, vol. 65, No. 6, Jun. 2017, pp. 3217-3220.

Xu, Rui, et al., "Design of Spiral Slot-Based Dual-Wideband Dual-Sense CP Antenna," The Institute of Engineering Technology, IET Journal, IET Microwaves, Antennas & Propagation, vol. 13, Issue 1, Aug. 2018, 76-81.

Yasan, Eray, et al., "Field Performance of a Novel Wideband Optically Transparent GNSS Antenna," IEEE, 2019 IEEE International Symposium on Antennas and Propagation and USNC-URSI Radio Science Meeting, AP-s 2019, Atlanta, Ga, USA, Jul. 7-12, 2019, pp. 847-848.

Yinusa, Kazeem A., "A Dual-Band Conformal Antenna for GNSS Applications in Small Cylindrical Structures," IEEE, IEEE Antennas and Wireless Propagation Letters, vol. 17, No. 6, Jun. 2018, pp. 1056-1059.

Zhang, Wen-Hai, et al., "Circularly Polarized Complementary Antenna With Tilted Beam Based on Orthogonal Dipoles," IEEE, IEEE Antennas and Wireless Propagation Letters, vol. 17, No. 8, Aug. 2018, pp. 1406-1410.

Zhong, Zeng-Pei, et al., "A Compact Dual-Band Circularly Polarized Antenna With Wide Axial-Ratio Beamwidth for Vehicle GPS Satellite Navigation Application," IEEE, IEEE Transactions on Vehicular Technology, vol. 68, No. 9, Sep. 2019, pp. 8683-8692.

Zhou, Hengyi, et al., "6x6 Array of Four-arm Spiral Antennas for High-gain Satellite Receiver Applications at Low Elevation," IEEE, 2018 IEEE International Symposium on Antennas and Propagation & USNC/URSI National Radio Science Meeting, AP-S-2018, Boston, MA, Jul. 8-13, 2018, pp. 469-470.

Zhou, Hengyi, et al., "A Four-Arm Circularly Polarized High-Gain High-Tilt Beam Curl Antenna for Beam Steering Applications," IEEE, IEEE Antennas and Wireless Propagation Letters, vol. 17, No. 6, Jun. 2018, pp. 1034-1038.

* cited by examiner

600

CURVE INFO
—— dB(Gain RHCP)
Freq=1.227GHz Phi=0deg

| Name | Theta | Ang | Mag |
|---|---|---|---|
| m1 | 0.0000 | 0.0000 | 5.0551 |
| m2 | -38.0000 | -38.0000 | 2.0087 |
| m3 | 54.0000 | 54.0000 | 2.0563 |

700

CURVE INFO
—— dB(Gain RHCP)
Freq=1.227GHz Phi=90deg

| Name | Theta | Ang | Mag |
|---|---|---|---|
| m1 | 0.0000 | 0.0000 | 5.0551 |
| m2 | -28.0000 | -28.0000 | 2.0795 |
| m3 | 36.0000 | 36.0000 | 2.1361 |

800

CURVE INFO
—— dB(Gain RHCP)
Freq=1.575GHz Phi=0deg

| Name | Theta | Ang | Mag |
|---|---|---|---|
| m1 | 0.0000 | 0.0000 | 5.4096 |
| m2 | -38.0000 | -38.0000 | 2.4286 |
| m3 | 36.0000 | 35.0000 | 2.3802 |

900

CURVE INFO
—— dB(Gain RHCP)
Freq=1.575GHz Phi=90deg

| Name | Theta | Ang | Mag |
|---|---|---|---|
| m1 | 0.0000 | 0.0000 | 5.4096 |
| m2 | -32.0000 | -32.0000 | 2.3672 |
| m3 | 50.0000 | 50.0000 | 2.5272 |

1400

CURVE INFO
—— dB(Gain RHCP)
Freq=1.227GHz Phi=0deg

| Name | Theta | Ang | Mag |
|---|---|---|---|
| m1 | 0.0000 | 0.0000 | 4.5897 |
| m2 | 40.0000 | 40.0000 | 1.0172 |
| m3 | -28.0000 | -28.0000 | 2.0860 |

1500

CURVE INFO
—— dB(Gain RHCP)
Freq=1.227GHz Phi=90deg

| Name | Theta | Ang | Mag |
|---|---|---|---|
| m1 | 0.0000 | 0.0000 | 4.897 |
| m2 | 50.0000 | 50.0000 | 1.7728 |
| m3 | -44.0000 | -44.0000 | 1.7680 |

1600

CURVE INFO
—— dB(Gain RHCP)
Freq=1.575GHz Phi=0deg

| Name | Theta | Ang | Mag |
|---|---|---|---|
| m1 | 0.0000 | 0.0000 | 5.0016 |
| m2 | -34.0000 | -34.0000 | 2.1837 |
| m3 | 22.0000 | 22.0000 | 1.3836 |

1700

CURVE INFO
—— dB(Gain RHCP)
Freq=1.575GHz Phi=90deg

| Name | Theta | Ang | Mag |
|---|---|---|---|
| m1 | 0.0000 | 0.0000 | 5.0016 |
| m2 | 46.0000 | 46.0000 | 1.8980 |
| m3 | -30.0000 | -30.0000 | 2.0624 |

ANTENNA WITH TILTED BEAM FOR USE ON ANGLED SURFACES

CROSS-REFERENCE TO RELATED APPLICATION

The present application claims the benefit of U.S. Provisional Patent Application Ser. No. 63/046,382, which was filed on Jun. 30, 2020, by Alireza Gharaati Jahromi et al. for ANTENNA WITH TILTED BEAM FOR USE ON ANGLED SURFACES, which is hereby incorporated by reference.

BACKGROUND

Technical Field

The present invention is directed towards antennas and more particularly to antennas with tilted beams for use on angled surfaces.

Background Information

The use of Global Navigation Satellite System (GNSS) information for navigation purposes in automobiles and other vehicles is well-known in the art. It is common for an automobile (or other vehicle) manufacturer to integrate a GNSS receiver and antenna into the vehicle at the time of manufacture. As conventional GNSS antennas are focused with a reception pattern that directed perpendicular to the plane of the antenna, typically GNSS antennas are mounted on a substantially horizontal surface of the vehicle. For example, the antenna may be mounted on the roof of the vehicle, to provide a good view of the sky.

A noted disadvantage of requiring that the antenna be mounted in a substantially horizontal manner is that, on certain vehicles, the number of horizontal surfaces may be limited. Additionally, the horizontal surfaces that are available may not be suitable for an antenna mount. For example, the hood of a vehicle may be substantially horizontal but not a suitable location to mount an antenna due to heat generated from the engine. More generally, in non-vehicle mounting environments, it may be desirous to mount an antenna on an angled surface, i.e., on a surface that is not substantially horizontal or vertical. Conventional GNSS antennas may suffer from negative performance when mounted on angled surfaces as the antenna's beam is focused perpendicular relative to the plane of the antenna. By angling the plane of the antenna, the reception pattern may not match the desired pattern. These negative characteristics may be exacerbated by, for example, the changing orientation of the vehicle onto which it is mounted. For example, if an antenna is mounted on an angled surface, as the vehicle turns, the plane of the antenna rotates, which may cause it to lose sight of portions of the sky. This may cause the antenna to lose track of one or more GNSS satellites, which may cause the GNSS receiver to not be able to provide position and/or velocity information.

Therefore, it is desirous for an antenna that can achieve its desired goals while on an angled surface.

SUMMARY

An antenna having a tilted beam for use on angled surfaces is provided. The antenna is formed of a mesh grid of microwires made of a conductive material overlaid onto a substrate. The mesh grid is configured so that the antenna's beam is angled relative to the perpendicular of the plane of the antenna. By mounting the antenna on an angled surface, the antenna's tilted beam may be directed in a desired direction, instead of perpendicular to the plane of the antenna. In a Global Navigation Satellite System (GNSS) arrangement, a GNSS antenna designed in accordance with the teachings herein may be located on an angled surface, but retain a tilted beam so that reception of GNSS signals is not hampered by the tilted nature of the antenna. Illustratively, the mesh grid is made of copper, but in alternative embodiments other materials may be utilized.

A reflector (ground plane) comprising of a mesh grid conductive material disposed on a substrate may be located a predefined distance away from the antenna. The use of an exemplary reflector (ground plane) is optional, but the presence of a reflector (ground plane) may serve to increase the front to back ratio of the antenna. In accordance with illustrative embodiments of the present invention, the substrate is a flexible material that may conform to the angled surface onto which the antenna is mounted. In alternative embodiments, the substrate may be transparent or translucent, which enables the mounting of antennas onto angled surfaces without obscuring a view, e.g., a windshield of a vehicle.

BRIEF DESCRIPTION OF THE DRAWINGS

The above and further advantages of the present invention are described herein in relation to the accompanying figures in which like reference numerals indicate identical, or functionally similar elements, of which.

The above and further advantages of the present invention are described herein in relation to the accompanying figures in which like reference numerals indicate identical, or functionally similar elements, of which.

DETAILED DESCRIPTION OF ILLUSTRATIVE EMBODIMENTS

Figure 1:
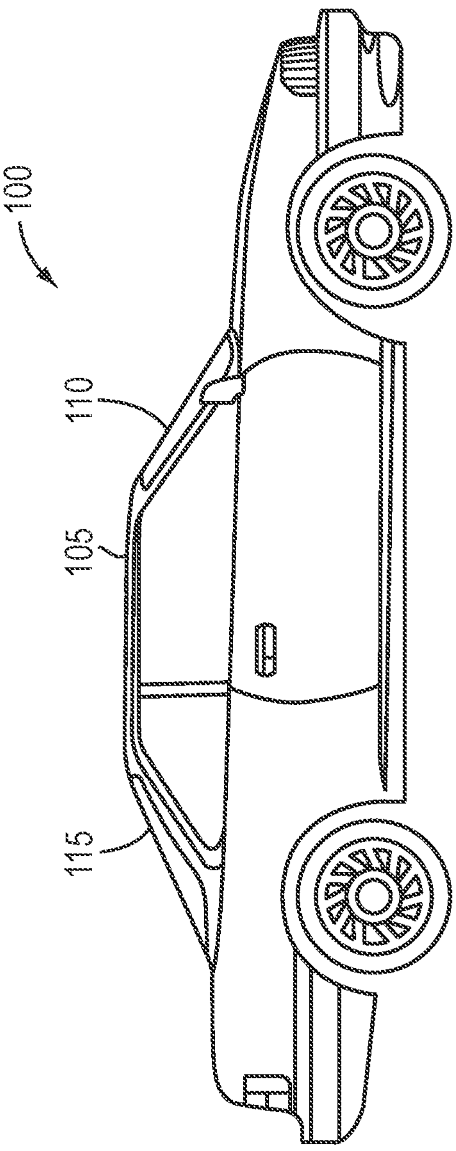
FIG. 1 is a side view of an exemplary automobile on which a Global Navigation Satellite System (GNSS) antenna may be mounted in accordance with an illustrative embodiment of the present invention.

FIG. 1 is a side view of an exemplary automobile 100 onto which a Global Navigation Satellite System (GNSS) antenna may be mounted in accordance with an illustrative embodiment of the present invention. It should be noted that an antenna designed in accordance with various embodiments of the present invention may be used in environments other than being mounted on a vehicle. It should also be noted that an antenna designed in accordance with the teachings of the present invention may be utilized for non-GNSS applications. However, the present invention is described in illustrative embodiments related to a GNSS antenna mounted on a vehicle. This description and depiction should be taken as exemplary only. It is expressly contemplated that the principles of the present invention may be used for non-GNSS antennas and for non-vehicle mounted antennas. Therefore, the description contained herein should be viewed as exemplary and non-limiting.

The vehicle 100 includes a plurality of exterior surfaces, including, e.g., roof 105, front windshield 110, and rear windshield 115. Conventional antennas may be mounted on roof 105 as it is substantially horizontal. However, it may not be desirous or practical to mount an antenna on the vehicle's roof 105 for a variety of reasons, e.g., in the case of a convertible automobile. Front and rear windshields 110, 115 provide angled surfaces onto which an antenna may be mounted in accordance with an illustrative embodiment of the present invention. The principles of the present invention may be utilized to locate an antenna on any angled surface. Therefore, the description of an antenna being mounted on a windshield should be taken as exemplary only. Any angled surface may be utilized to locate an antenna in accordance with illustrative embodiments of the present invention.

Figure 2:
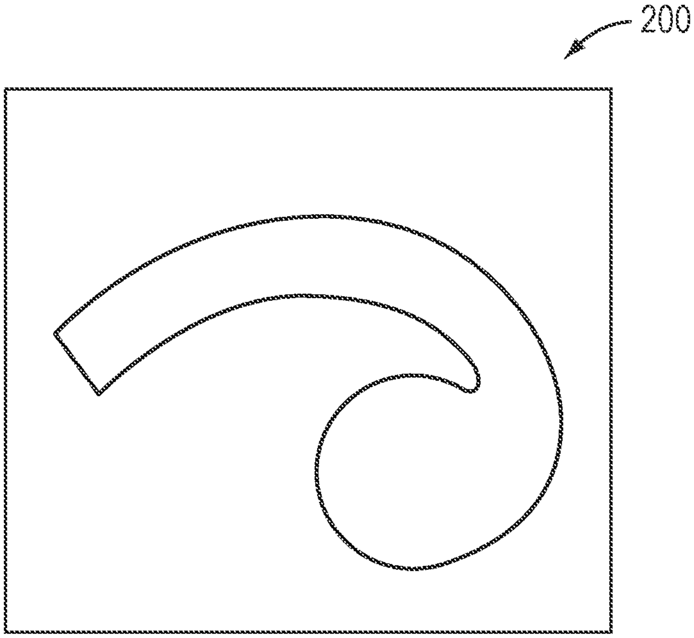
FIG. 2 is a diagram of a spiral configuration of an exemplary antenna in accordance with an illustrative embodiment of the present invention.

FIG. 2 is a diagram of a spiral configuration of an exemplary antenna 200 in accordance with an illustrative embodiment of the present invention. Exemplary spiral configuration 200 illustrates the overall layout and configuration of an exemplary antenna that may be implemented in accordance with an illustrative embodiment of the present invention. As will be appreciated by those skilled in the art, a spiral antenna 200 may be circularly polarized (CP). In exemplary embodiments where the novel antenna is used for GNSS purposes, the antenna 200 may be implemented as a right hand circularly polarized (RHCP) antenna for optimal performance. As will be appreciated by those skilled in the art, an antenna designed for other polarizations may have a differing shape.

Figure 3A:
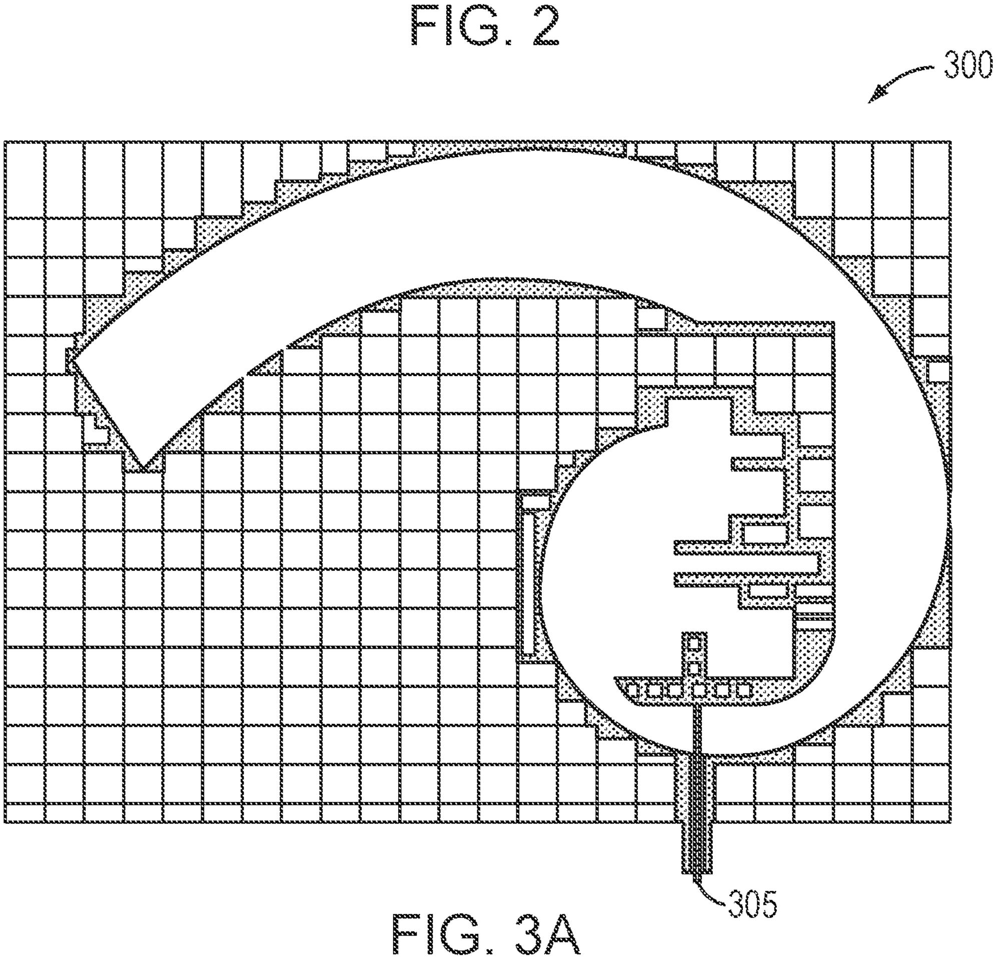
FIG. 3A is a diagram of the layout of an exemplary antenna for use on an angled surface in accordance with an illustrative embodiment for the present invention.
Figure 3B:
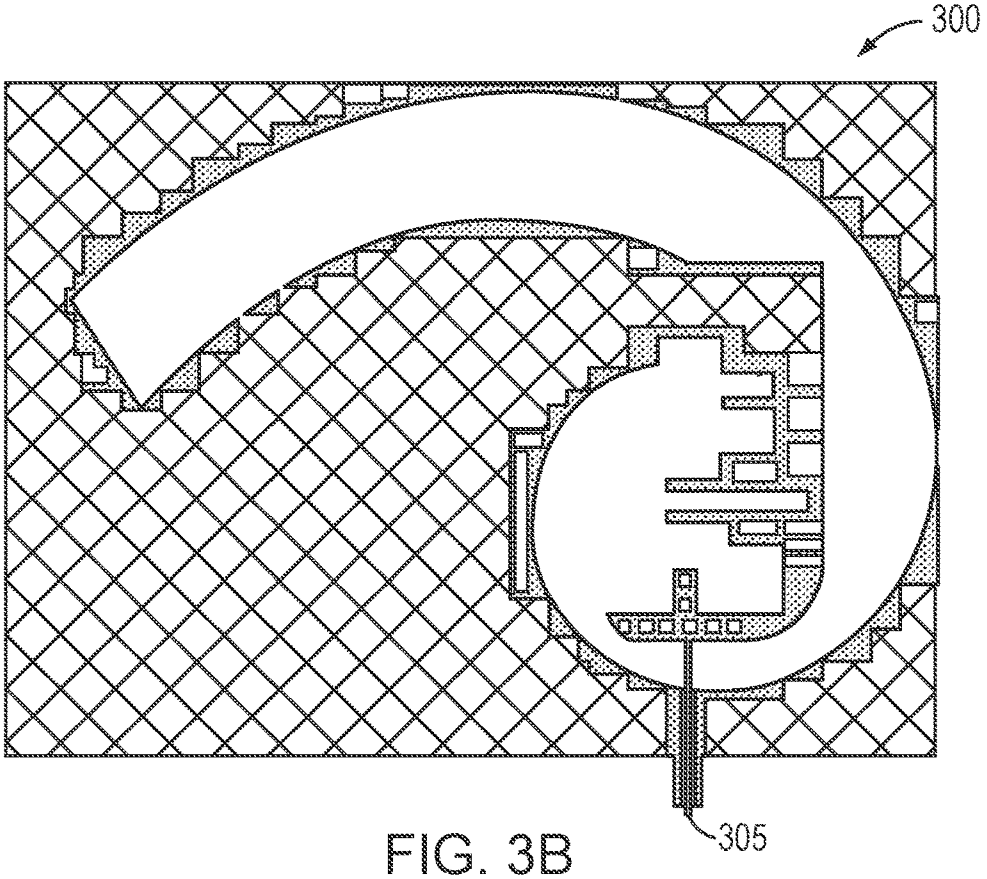
FIG. 3B is a diagram of the layout of an exemplary antenna for use on an angled surface in accordance with an illustrative embodiment for the present invention.
Figure 3C:
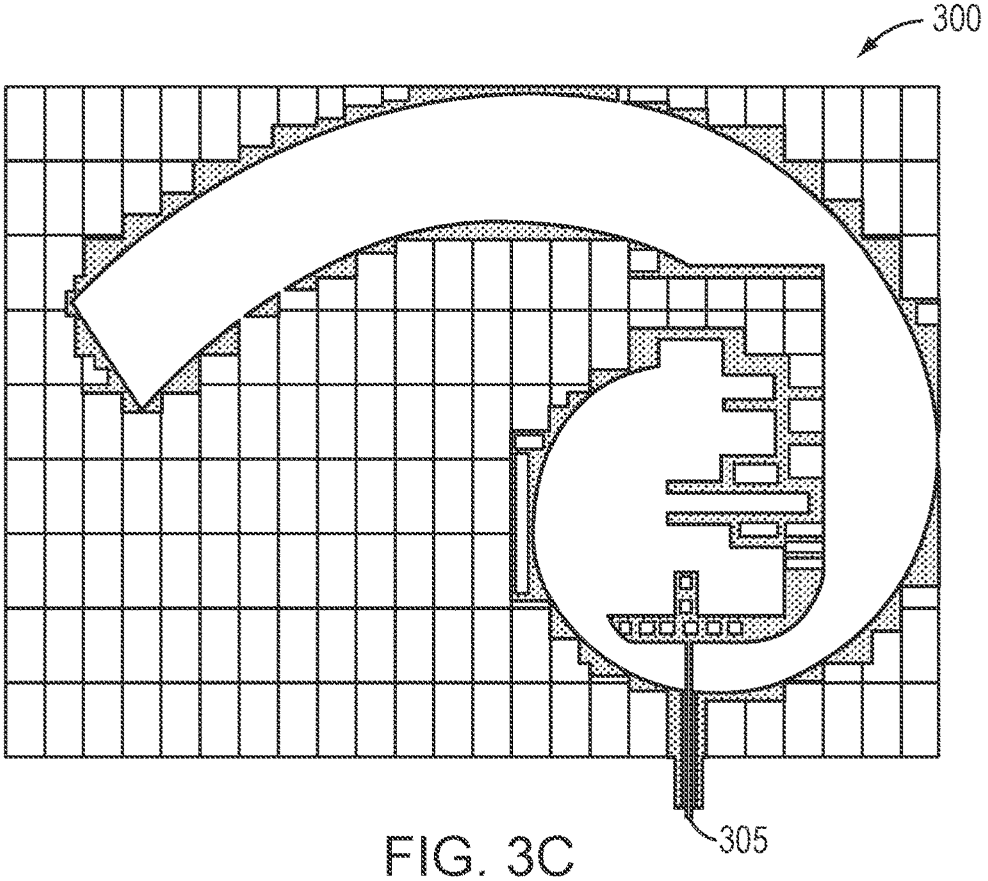
FIG. 3C is a diagram of the layout of an exemplary antenna for use on an angled surface in accordance with an illustrative embodiment for the present invention.

FIG. 3A is a diagram of the layout of an exemplary antenna 300 for use on an angled surface in accordance with an illustrative embodiment for the present invention. As will be appreciated by those skilled in the art, conventional antennas typically have maximum gain at their zenith (0=0). It has been noted that automobile windshields are angled at an approximately 30-degree inclination. As will be appreciated, some are more angled, while others are less angled. However, 30 degrees is a close approximation of an automobile windshield. The exemplary antenna described herein is designed so that its beam is tilted at approximately 30 degrees, i.e., 0=30 degrees. Therefore, when mounted on an angled surface, e.g., an automobile windshield, the antenna's beam is aimed directly upwards, which is useful for the reception of GNSS satellite signals. In alternative embodiments of the present invention, an antenna according to the principles of the present invention may have its beam tilted at differing angles, e.g., 45 or 50 degrees. Therefore, the description of the antenna beam being tilted by 30 degrees should be taken as exemplary only. Illustratively, the size and/or length of the spiral arms of the antenna may be increased in order to increase the angle of tilt of the beam FIG. 3B is a diagram of the layout of an exemplary antenna 300 for use on an angled surface in accordance with an illustrative embodiment for the present invention. FIG. 3C is a diagram of the layout of an exemplary antenna 300 for use on an angled surface in accordance with an illustrative embodiment for the present invention.

Exemplary antenna 300 is a microstrip antenna that is comprised of a conducting layer that is disposed on a substrate layer. Illustrative, the conductive layer is comprised of a single conductive track printed (or otherwise disposed) on the substrate. In accordance with an illustrative embodiment, the antenna has a single conductive layer. However, in alternative embodiments, an antenna may have a plurality of conductive layers.

Illustratively, the antenna is formed by the conductive layer being formed in a mesh arrangement from microwires on the substrate. A feed line 305 provides connectivity to/from the antenna and, e.g., a GNSS receiver (not shown). In alternative embodiments, the feed line 305 may connect the antenna 300 with another transmitter, receiver, and/or transceiver.

In an illustrative embodiment of the present invention, the microwires comprising the mesh are made of copper. However, in alternative embodiments of the present invention other materials may be utilized. Therefore, the description of the microwires being made of copper should be taken as exemplary only.

Illustratively, each microwire has a predefined width. In an illustrative embodiment, this width is approximately 0.1 mm. However, it is expressly contemplated that other widths may be utilized in accordance with alternative embodiments of the present invention. As described further below, narrower widths may be used to increase overall transparency of antenna 300 in exemplary embodiments that utilized a non-opaque substrate.

In accordance with an illustrative embodiment of the present invention, each square of the mesh is of a predefined size. In an illustrative embodiment, each square has a length of approximately 6.9 mm. In alternative embodiments, and antenna may be sized differently to operate at differing frequencies. Further, the size and length of the spiral arms may be lengthened to increase the tilt of the beam.

The substrate may be any material that has a suitable dielectric constant. One exemplary substrate is the Rogers RO3006 substrate having a thickness of approximately 0.64 mm. Another exemplary substrate is glass having a thickness of approximately 1 mm. However, it is expressly contemplated that other substrates may be utilized in alternative embodiments of the present invention. In certain embodiments, the antenna may be disposed on a windshield, or other transparent component. In such alternative embodiments, the substrate is substantially transparent or translucent. For example, the conductive layer may be directly printed on the glass of a windshield 110, thereby using the windshield 110 as the substrate. In these embodiments, the conductive layer is designed to be as optically transparent as possible. This may be achieved by reducing the width of the microwires forming the mesh from, e.g., approximately 0.1 mm to 0.05 mm.

Further, it should be noted that in alternative embodiments, the substrate may be flexible or otherwise capable of being conformed to a surface. In such embodiments, this substrate may be used to locate an antenna onto a non-planar surface such as a curved windshield. As will be appreciated by those skilled in the art, as the overall curvature of the antenna increases, the antenna performance in terms of gain and axial ratio will drop down. Depending on the desired application, an antenna using a substrate that is overly curved may render the antenna unsuitable for the application. This may result in design choices as to size and overall curvature of the substrate.

It is expressly contemplated that any material with a suitable dielectric constant may be utilized as the substrate in accordance with alternative embodiments of the present invention. Therefore, the description contained herein of specific materials, sizes, thicknesses, and/or levels of transparency of the substrate should be taken as exemplary only.

Spiral antennas may be utilized to generate circular polarization and a tilted beam due to the curved configuration at certain frequencies by setting the beginning and ending of the configuration arm(s) appropriately. Alternatively, the tilted beam may have its angle changed by changing the overall size of the antenna. In the example of antenna 300, the antenna is circularly polarized with a tilted beam by using the base spiral antenna design and then adding several slots to cause asymmetry in the current distribution and making equal amplitudes of the orthogonal field components $E_x$, $E_y$ with a 90 degree phase difference at the tilted angle. To achieve right hand circular polarization, the surface current orientation should rotate in a counterclockwise fashion.

Figure 4:
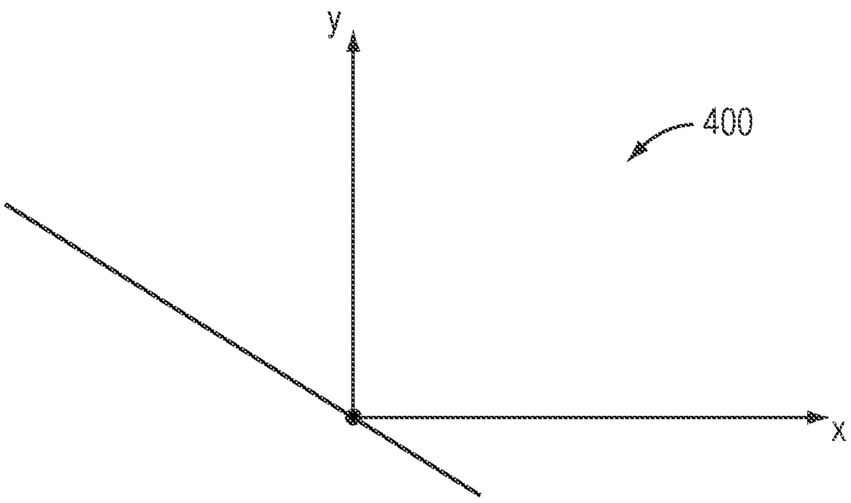
FIG. 4 is a view of the coordinate axes of an exemplary antenna in accordance with an illustrative embodiment for the present invention.
Figure 5:
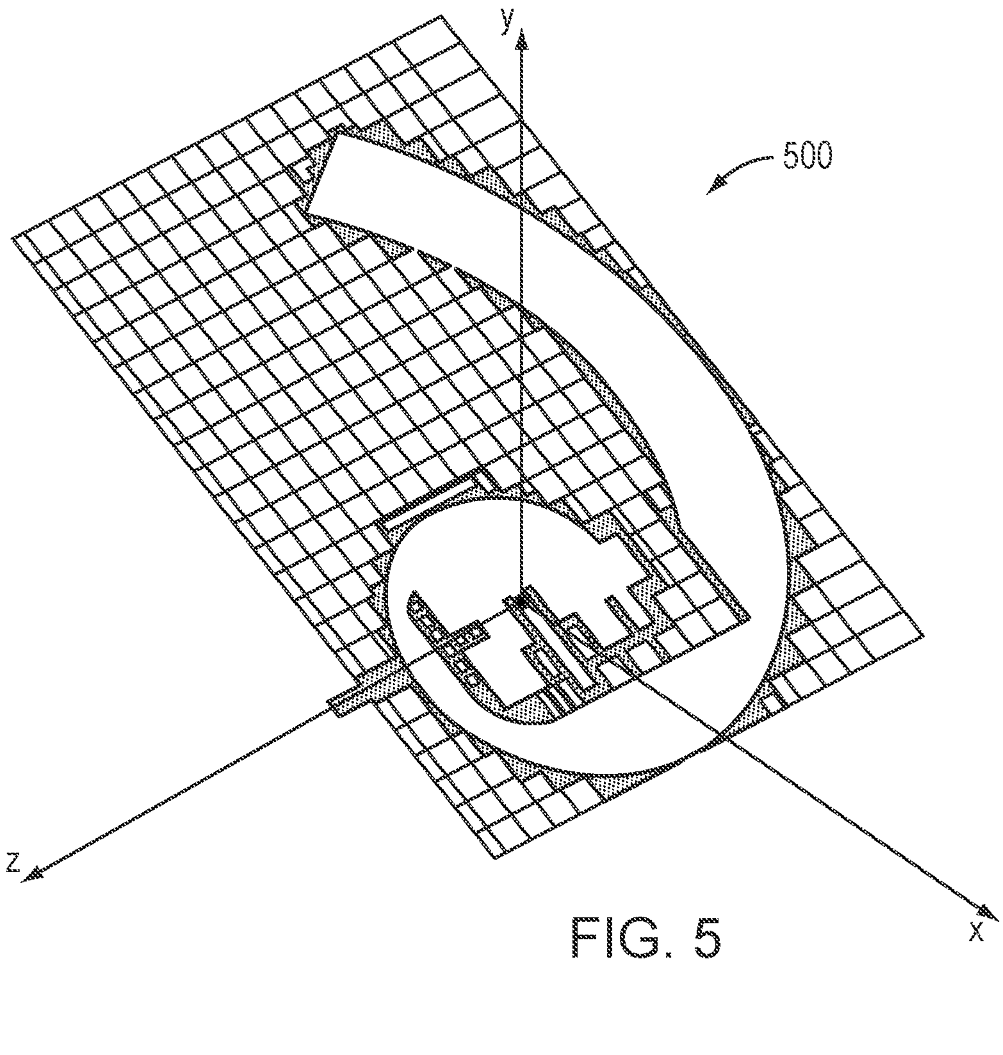
FIG. 5 is an isometric view of an exemplary antenna overlaid with coordinate axes in accordance with an electret embodiment of the present invention.

FIG. 4 is a view of the coordinate axes of an exemplary antenna in accordance with an illustrative embodiment for the present invention. View 400 is illustratively of looking at antenna 300 along the plane of the substrate, i.e., along the Z-axis. As can be seen from view 400, the X-Y axes are tilted from the perpendicular to the plane of the antenna. This is also shown in FIG. 5 which is an isometric view of an exemplary antenna 300 overlaid with coordinate axes in accordance with an electret embodiment of the present invention. In view 500, the Z-axis lies on the plane of the antenna. The X axis is angled up from the plane of the antenna. The Y axis is angled from the perpendicular. Exemplary view 500 illustrates how the antenna is tilted from the perpendicular of the plane of the antenna.

Figure 6:
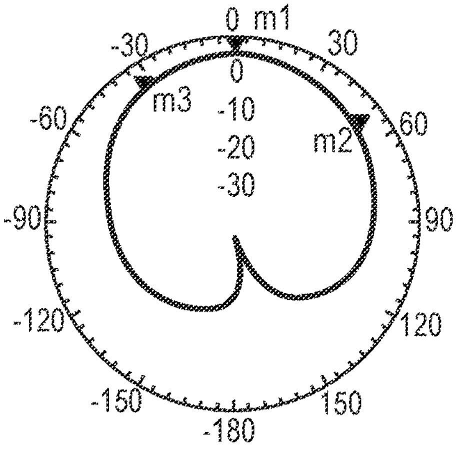
FIG. 6 is a graph of an exemplary radiation pattern in accordance with an illustrative embodiment of the present invention.
Figure 7:
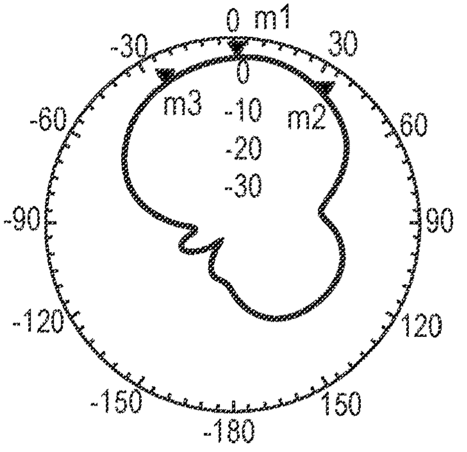
FIG. 7 is a graph of an exemplary radiation pattern in accordance with an illustrative embodiment of the present invention.
Figure 8:
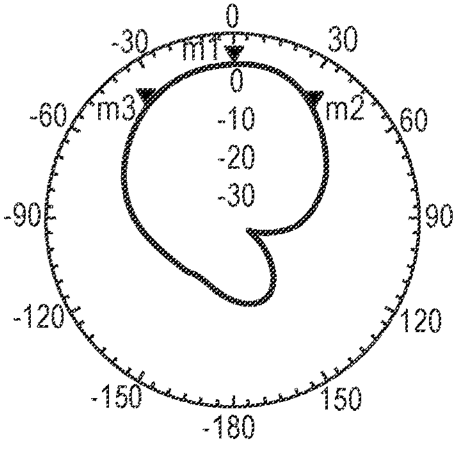
FIG. 8 is a graph of an exemplary radiation pattern in accordance with an illustrative embodiment of the present invention.
Figure 9:
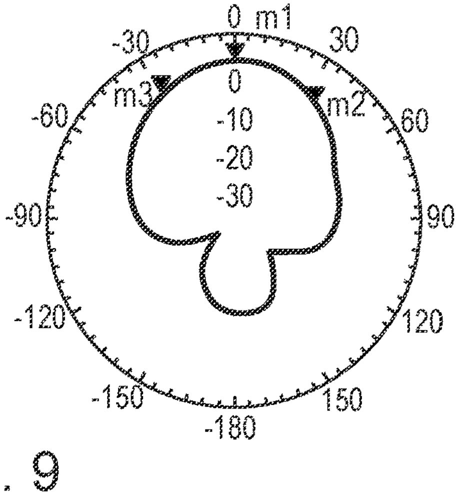
FIG. 9 is graph of an exemplary radiation pattern in accordance with an illustrative embodiment of the present invention.

FIGS. 6-9 are graphs of exemplary radiation patterns 600-900 of an exemplary antenna 300 in accordance with illustrative embodiments of the present invention. FIGS. 6-7 illustrate the RHCP radiation pattern for 1.227 GHz (the Global Positioning System (GPS) L2 band), while FIGS. 8-9 illustrate the RHCP radiation pattern for 1.575 GHz (the GPS L1 band).

Figure 11:
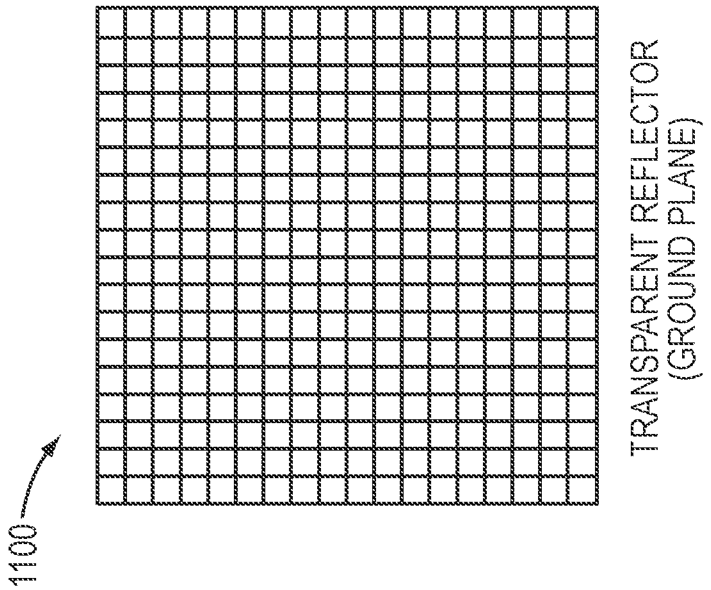
FIG. 11 is a view of the layout of an exemplary reflector (ground plane) in accordance with an illustrative embodiment of the present invention.
Figure 10:
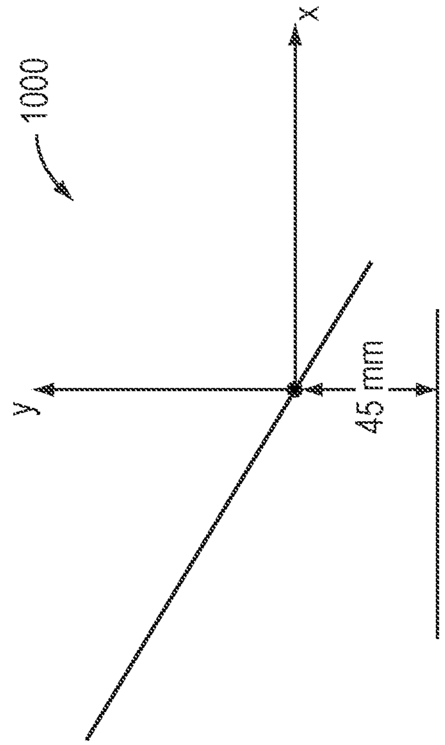
FIG. 10 is a view of placement of an exemplary reflector (ground plane) in accordance with an illustrative embodiment of the present invention.

FIG. 10 is a view of the placement of an exemplary reflector (ground plane) 1000 in accordance with an illustrative embodiment of the present invention. In accordance with an illustrative embodiment, a reflector (ground plane), described below in reference to FIG. 11 is located at a predefined distance from the antenna. In the example of an antenna shown in FIG. 3, the reflector (ground plane) is located 45 mm below the antenna. If an antenna 300 is mounted on the front windshield 110 of an automobile, the reflector (ground plane) may be located on the top of a dashboard, glovebox, etc. within the passenger compartment of the vehicle. Illustratively, the use of a reflector (ground plane) with the exemplary antenna 300 increases the front to back ratio to approximately 5 dB.

FIG. 11 is a view of the layout of an exemplary reflector (ground plane) 1100 in accordance with an illustrative embodiment of the present invention. Illustratively, the reflector (ground plane) is approximately 10 cm×10 cm and is formed by a plurality of microwires forming a mesh grid arrangement on a non-conductive substrate as shown in FIG. 11. The substrate may comprise the same material as used for the substrate of the antenna or may be a different material. Alternatively, no substrate may be used. In such alternative embodiments, only the conductive layer with mesh grid pattern is present. Further, in alternative embodiments, the windshield may act as the substrate. The microwires may have the same width as the antenna or may differ.

Figure 12:
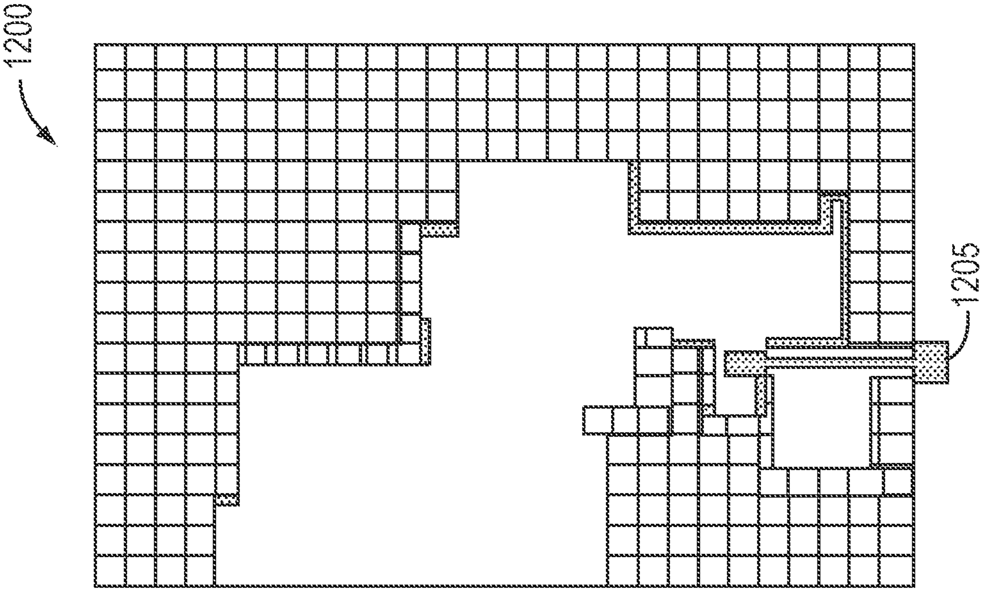
FIG. 12 is a diagram of the layout of an exemplary antenna for use on an angled surface in accordance with an illustrative embodiment for the present invention.

FIG. 12 is a diagram of the layout of an exemplary antenna 1200 for use on an angled surface in accordance with an illustrative embodiment for the present invention. Exemplary antenna 1200 is an alternative design that may be utilized in accordance with illustrative embodiments of the present invention. Antenna 1200 is similarly comprised of a conductive layer overlaid into a substrate. The conductive layer is illustratively arranged into a grid pattern by the use of microwires forming a mesh. By the arrangement of voids within the mesh, a pattern is created that generates the tilted beam in accordance with illustrative embodiments of the present invention.

The microwires of antenna 1200 are illustratively copper but may be made of any suitable conductive material. Illustratively, the width of the microwires is approximately 0.1 mm; however, in alternative embodiments, the width may vary. The size of each grid of the mesh is approximately 5.4 mm, but may vary in other regions throughout the antenna.

Figure 13:
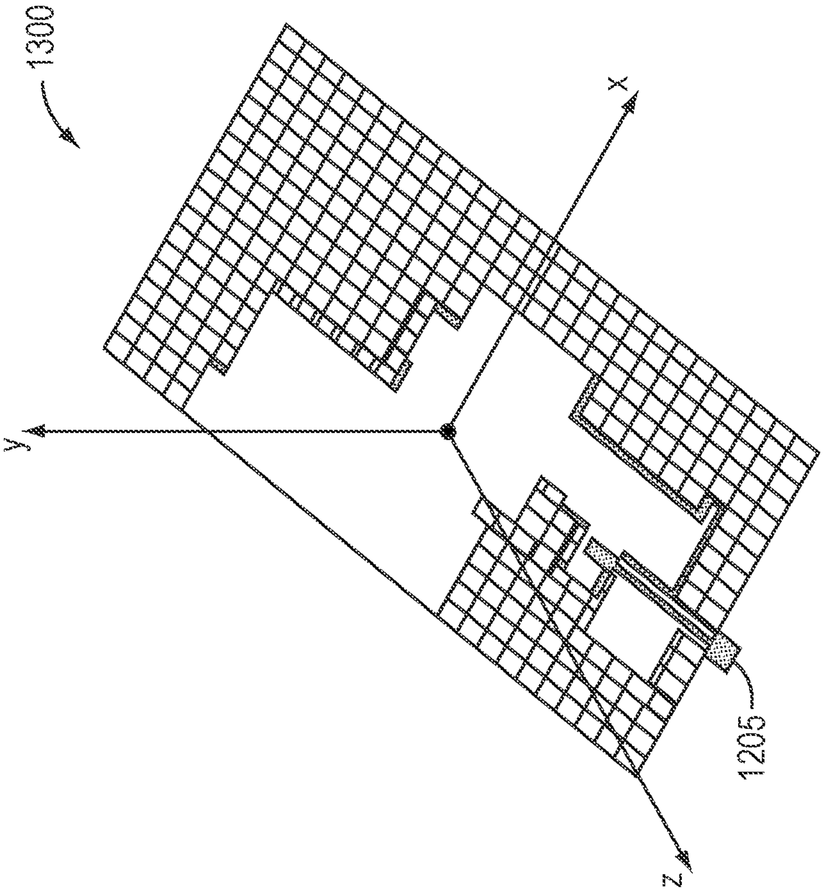
FIG. 13 is an isometric view showing coordinate axes in accordance with an illustrative embodiment of the present invention.

FIG. 13 is an isometric view 1300 showing coordinate axes in accordance with an illustrative embodiment of the present invention. Similar to view 400, described above, view 1300 illustrates that the X-Y axes are angled relative to the plane of the antenna. In accordance with an illustrative embodiment of the present invention, this angle is 30 degrees. However, in alternative embodiments, this angle may vary.

Figure 14:
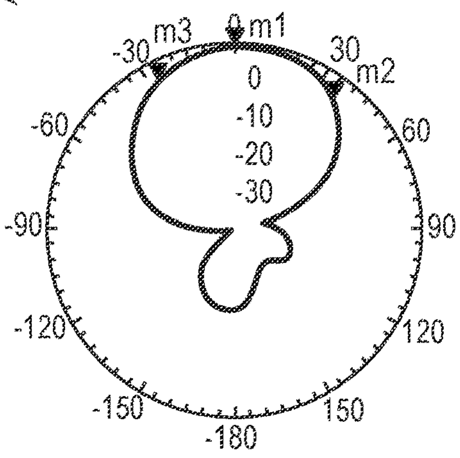
FIG. 14 is a graph of an exemplary radiation pattern in accordance with an illustrative embodiment of the present invention.
Figure 15:
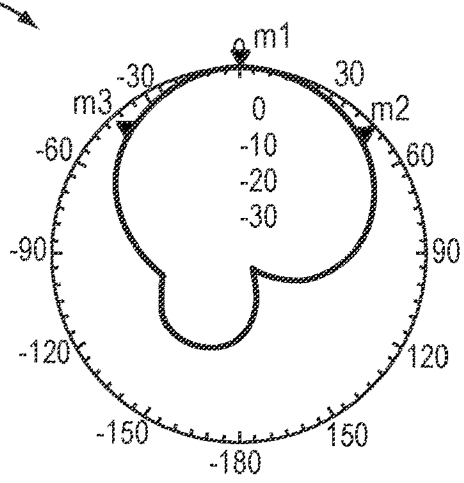
FIG. 15 is a graph of an exemplary radiation pattern in accordance with an illustrative embodiment of the present invention.
Figure 16:
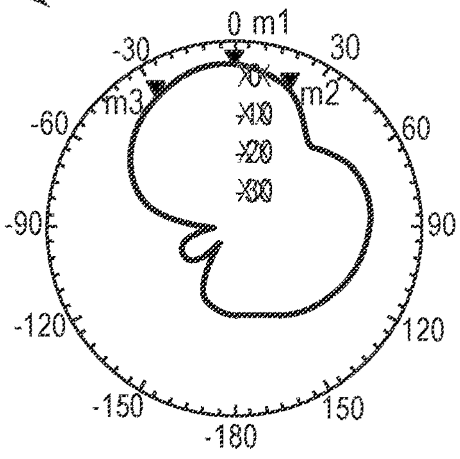
FIG. 16 is a graph of an exemplary radiation pattern in accordance with an illustrative embodiment of the present invention.
Figure 17:
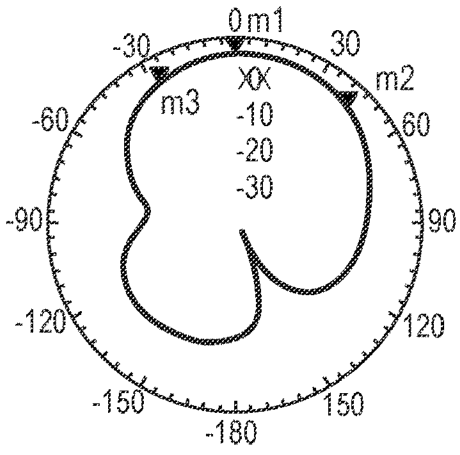
FIG. 17 is a graph of an exemplary radiation pattern in accordance with an illustrative embodiment for the present invention.

FIGS. 14-17 are graphs of exemplary radiation patterns 1400-1700 of antenna 1200 in accordance with an illustrative embodiment of the present invention. FIGS. 14-15 illustrate the RHCP radiation pattern for 1.227 GHz (the GPS L2 band), while FIGS. 16-17 illustrate the RHCP radiation pattern for 1.575 GHz (the GPS L1 band).

Figure 18:
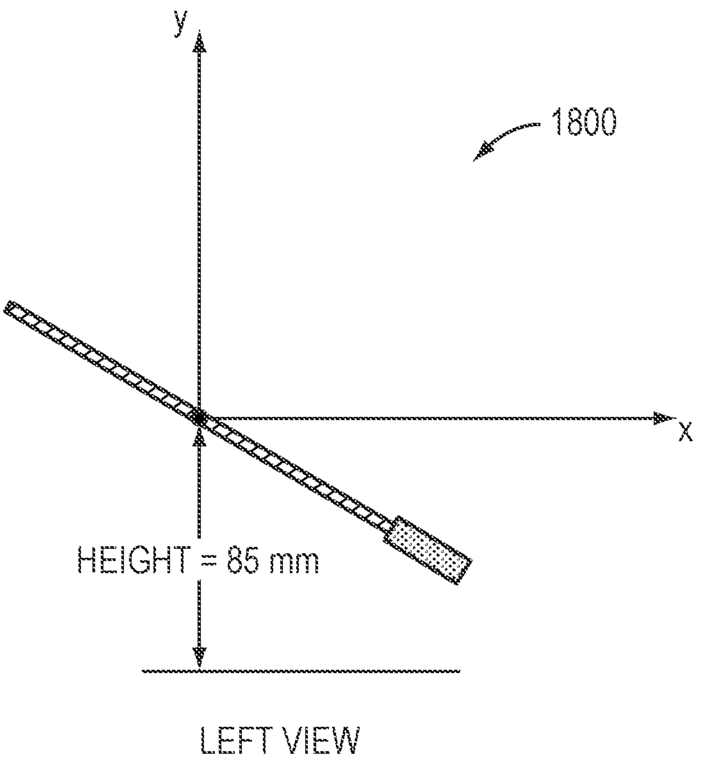
FIG. 18 is a view illustrating placement of an exemplary reflector (ground plane) in accordance with an illustrative embodiment for the present invention.

FIG. 18 is a view 1800 illustrating placement of an exemplary reflector (ground plane) in accordance with an illustrative embodiment for the present invention. Similar to the first exemplary embodiment of FIGS. 3-9, the antenna 1200 may be improved by placement of a reflector (ground plane), such as reflector (ground plane) 1100 a predefined distance away from the antenna. In the example of antenna 1200, the predefined distance is approximately 85 mm.

Various embodiments of the present invention have been disclosed. However, it is expressly contemplated that variations of the description may be utilized in accordance with the principles of the present invention. While examples of antennas with tilted beams for mounting on angled surfaces that operate at GNSS frequencies are shown and described, the principles of the present invention may be utilized with other antennas and uses. As will be appreciated by those skilled in the art, an exemplary antenna has an inverse relationship between size and frequency. Therefore, an exemplary antenna may be sized for higher or lower frequencies in accordance with alternative embodiments of the present invention. Therefore, the description of GNSS antennas and frequencies should be taken as exemplary only. As such, the description of sizes, shapes, frequency bands, etc. should be taken as exemplary only. For example, predefined shapes of the mesh may be a square, a rectangle, a diamond, etc. or example, the antenna may have a substantially rectangular configuration.

What is claimed is:

1. An antenna comprising:

a substrate made of a dielectric material;

a single radiating element configured as a conductive layer disposed onto a first surface of the substrate forming a pattern, the conductive layer being comprised of one or more microwires forming a conductive mesh, wherein each component of the conductive mesh has a predefined shape, voids in the conductive mesh forming a predefined pattern, wherein the predefined pattern comprises a spiral including asymmetrical slots;

wherein a beam of the antenna is angled relative to perpendicular of a plane of the antenna; and wherein the antenna is circularly polarized.

2. The antenna of claim 1 wherein the substrate is substantially transparent.

3. The antenna of claim 1 wherein the substrate comprises a component of a vehicle.

4. The antenna of claim 1 wherein the microwires are made of metal.

5. The antenna of claim 4 wherein the metal is copper.

6. The antenna of claim 1 further comprising a reflector (ground plane), wherein the reflector (ground plane) is located a predefined distance from the antenna.

7. The antenna of claim 6 wherein the reflector (ground plane) comprises of a reflector (ground plane) substrate and a reflector (ground plane) conductive layer applied onto a first surface of the reflector (ground plane) substrate.

8. The antenna of claim 7 wherein the reflector (ground plane) conductive layer is a mesh pattern formed by one or more reflector (ground plane) microwires.

9. The antenna of claim 1 wherein the beam of the antenna is angled 30 degrees off of the perpendicular of the plane of the substrate.

10. The antenna of claim 1 wherein the substrate is flexible.

11. The antenna of claim 10 wherein the substrate conforms to a shape of a surface on which it is mounted.

12. The antenna of claim 1 wherein the antenna covers at least one frequency band used by a Global Navigation Satellite System (GNSS).

13. The antenna of claim 12 wherein the at least one frequency band is a Global Positioning System (GPS) L1 band.

14. The antenna of claim 1 wherein the antenna is right hand circularly polarized.

15. The antenna of claim 1 wherein the predefined shape is a square.

16. The antenna of claim 1 wherein the predefined shape is a diamond.

17. The antenna of claim 1 wherein the predefined shape is a rectangle.

18. A radiating element comprising:

a substrate made of a dielectric material;

a conductive layer disposed onto a first surface of the substrate forming a pattern, the conductive layer being comprised of one or more microwires forming a conductive mesh, wherein each component of the conductive mesh has a predefined shape, voids in the conductive mesh forming a predefined pattern;

wherein a beam of the radiating element is angled relative to perpendicular of a plane of the radiating element; and wherein the radiating element is circularly polarized.

* * * * *